(12) United States Patent
Li et al.

(10) Patent No.: US 11,644,565 B2
(45) Date of Patent: May 9, 2023

(54) RADAR SYSTEM WITH SPARSE PRIMARY ARRAY AND DENSE AUXILIARY ARRAY

(71) Applicant: Aptiv Technologies Limited, St. Michael (BB)

(72) Inventors: Zhengzheng Li, Agoura Hills, CA (US); Xin Zhang, Calabasas, CA (US); Yu Zhang, Thousand Oaks, CA (US)

(73) Assignee: Aptiv Technologies Limited, St. Michael (BB)

( * ) Notice: Subject to any disclaimer, the term of this patent is extended or adjusted under 35 U.S.C. 154(b) by 164 days.

(21) Appl. No.: 17/153,788

(22) Filed: Jan. 20, 2021

(65) Prior Publication Data

US 2022/0113399 A1    Apr. 14, 2022

Related U.S. Application Data

(60) Provisional application No. 63/091,193, filed on Oct. 13, 2020.

(51) Int. Cl.
  *G01S 13/87*    (2006.01)
  *G01S 13/931*   (2020.01)

(52) U.S. Cl.
  CPC .......... *G01S 13/872* (2013.01); *G01S 13/878* (2013.01); *G01S 13/931* (2013.01); *G01S 2013/93271* (2020.01)

(58) Field of Classification Search
  CPC ...... G01S 13/42; G01S 13/872; G01S 13/878; G01S 13/931; G01S 2013/93271; G01S 7/032; G01S 7/2813; H01Q 21/22
  See application file for complete search history.

(56) References Cited

U.S. PATENT DOCUMENTS

| 5,657,027 A | 8/1997 | Guymon |
|---|---|---|
| 7,474,262 B2 | 1/2009 | Alland |

(Continued)

FOREIGN PATENT DOCUMENTS

| CN | 106772224 A | 5/2017 |
|---|---|---|
| CN | 111239678 A | 6/2020 |

(Continued)

OTHER PUBLICATIONS

Pursuant to MPEP § 2001 6(b) the applicant brings the following co-pending application to the Examiner's attention: U.S. Appl. No. 17/075,632.

(Continued)

*Primary Examiner* — Timothy A Brainard
(74) *Attorney, Agent, or Firm* — Sawtooth Patent Group PLLC

(57) ABSTRACT

This document describes techniques and components of a radar system with a sparse primary array and a dense auxiliary array. Even with fewer antenna elements than a traditional radar system, an example radar system has a comparable angular resolution at a lower cost, lower complexity level, and without aliasing. The radar system includes a processor and antenna arrays that can receive electromagnetic energy reflected by one or more objects. The antenna arrays include a primary subarray and an auxiliary subarray. The auxiliary subarray includes multiple antenna elements with a smaller spacing than the antenna elements of the primary subarray. The processor can determine, using the received electromagnetic energy, first and second potential angles associated with the one or more objects. The processor then associates, using the first and second potential angles, respective angles associated with each of the one or more objects.

20 Claims, 8 Drawing Sheets

(56) References Cited

U.S. PATENT DOCUMENTS

| | | | |
|---|---|---|---|
| 7,639,171 | B2 | 12/2009 | Alland et al. |
| 9,869,762 | B1 | 1/2018 | Alland et al. |
| 10,416,680 | B2 | 9/2019 | Li et al. |
| 10,446,923 | B2 * | 10/2019 | Watson ............... H01Q 21/065 |
| 10,809,737 | B2 | 10/2020 | Li et al. |
| 2017/0149147 | A1 | 5/2017 | Minami et al. |
| 2018/0149736 | A1 | 5/2018 | Alland et al. |
| 2019/0285738 | A1 | 9/2019 | Iwasa et al. |
| 2019/0324133 | A1 | 10/2019 | Hong et al. |
| 2020/0004262 | A1 | 1/2020 | Li et al. |
| 2020/0256947 | A1 | 8/2020 | Motoda |
| 2020/0309899 | A1 * | 10/2020 | Jonas ................... G01S 13/931 |
| 2021/0373144 | A1 * | 12/2021 | Amani ................. G01S 13/931 |
| 2022/0163623 | A1 * | 5/2022 | Kishigami .......... H01Q 21/065 |

FOREIGN PATENT DOCUMENTS

| | | |
|---|---|---|
| EP | 2662699 A1 | 11/2013 |
| EP | 3757607 A1 | 12/2020 |
| JP | 6523350 B2 | 5/2019 |
| WO | 2021096889 A1 | 5/2021 |

OTHER PUBLICATIONS

Gu, et al., "Joint SVD of Two Cross-Correlation Matrices to Achieve Automatic Pairing in 2-D Angle Estimation Problems", IEEE Antennas and Wireless Propagation Letters, vol. 6, pp. 553-556, 2007, 4 pages.

Kikuchi, et al., "Pair-Matching Method for Estimating 2-D Angle of Arrival With a Cross-Correlation Matrix", IEEE Antennas and Wireless Propagation Letters, vol. 5, pp. 35-40, 2006, 6 pages.

Moffet, "Minimum-Redundancy Linear Arrays", IEEE Transactions on Antennas and Propagation, vol. AP-16, No. 2., Mar. 1968, pp. 172-175, 4 pages.

Tropp, et al., "Signal Recovery From Random Measurements Via Orthogonal Matching Pursuit", IEEE Transactions on Information Theory, vol. 53, No. 12, Dec. 2007, pp. 4655-4666, Dec. 2007, 12 pages.

Vaidyanathan, et al., "Sparse Sensing with Co-Prime Samplers and Arrays", IEEE Trans. Signal Process., vol. 59, No. 2, Feb. 2011, pp. 573-586, 14 pages.

Van Trees, "Planar Arrays and Apertures", Essay in "Detection, Estimation, and Modulation Theory, Optimum Array Processing", pp. 231-274. Wiley-Interscience, 2001, 44 pages.

Wang, et al., "Two-Dimensional Beamforming Automotive Radar with Orthogonal Linear Arrays", 2019 IEEE Radar Conference, Boston, MA, Apr. 22-26, 2019, 6 pages.

"Extended European Search Report", EP Application No. 21196393. 9, dated Feb. 28, 2022, 11 pages.

Amin, et al., "Sparse Arrays and Sampling for Interference Mitigation and DOA Estimation in GNSS", Proceedings of the IEEE, vol. 104, No. 6, Jun. 2016, pp. 1302-1317.

Haardt, et al., "Unitary ESPRIT: How to Obtain Increased Estimation Accuracy with a Reduced Computational Burden", May 1995, 1232-1242.

Roy, et al., "ESPRIT-Estimation of Signal Parameters via Rotational Invariance Techniques", Jul. 1989, pp. 984-995.

Zoltowski, et al., "Closed-Form 2-D Angle Estimation with Rectangular Arrays in Element Space or Beamspace via Unitary ESPRIT", Feb. 1996, pp. 316-328.

"Extended European Search Report", EP Application No. 21196394. 7, dated Mar. 4, 2022, 11 pages.

"Extended European Search Report", EP Application No. 21215410. 8, dated Jul. 12, 2022, 9 pages.

"Extended European Search Report", EP Application No. 21216322. 4, dated Jun. 3, 2022, 9 pages.

Chen, et al., "A new method for joint DOD and DOA estimation in bistatic MIMO radar", Feb. 2010, pp. 714-718.

Engels, et al., "Automotive MIMO Radar Angle Estimation in the Presence of Multipath", Oct. 2017, 5 pages.

Gu, et al., "Adaptive Beamforming via Sparsity-Based Reconstruction of Covariance Matrix", Compressed Sensing in Radar Signal Processing, 2019, 33 pages.

Gu, et al., "Robust Adaptive Beamforming Based on Interference Covariance Matrix Reconstruction and Steering Vector Estimation", IEEE Transactions on Signal Processing, vol. 60, No. 7, Jul. 2012, pp. 3881-3885.

Gu, et al., "Robust Adaptive Beamforming Based on Interference Covariance Matrix Sparse Reconstruction", Signal Processing, vol. 96, Mar. 1, 2014, pp. 375-381.

Jiang, et al., "Joint DOD and DOA Estimation for Bistatic MIMO Radar in Unknown Correlated Noise", Nov. 2015, 5113-5125.

Jin, "Joint DOD and DOA estimation for bistatic MIMO radar", Feb. 2009, pp. 244-251.

Steinwandt, et al., "Performance Analysis of ESPRIT-Type Algorithms for Co-Array Structures", Dec. 10, 2017, 5 pages.

Sun, et al., "MIMO Radar for Advanced Driver-Assistance Systems and Autonomous Driving: Advantages and challenges", Jul. 2020, pp. 98-117.

Visentin, et al., "Analysis of Multipath and DOA Detection Using a Fully Polarimetric Automotive Radar", Apr. 2018, 8 pages.

Zhou, et al., "A Robust and Efficient Algorithm for Coprime Array Adaptive Beamforming", IEEE Transactions on Vehicular Technology, vol. 67, No. 2, Feb. 2018, pp. 1099-1112.

Zoltowski, et al., "ESPRIT-Based 2-D Direction Finding with a Sparse Uniform Array of Electromagnetic Vector Sensors", Aug. 1, 2000, pp. 2195-2204.

Feger, et al., "A 77-GHz FMCW MIMO Radar Based on an SiGe Single-Chip Transceiver", IEEE Transactions on Microwave Theory and Techniques, vol. 57, No. 5, May 2009, pp. 1020-1035.

Razavi-Ghods, "Characterisation of MIMO Radio Propagation Channels", Durham theses, Durham University. Available at Durham E-Theses Online: http://etheses.dur.ac.uk/2526/ (Year: 2007), 349 pages.

"Extended European Search Report", EP Application No. 22197753. 1, dated Mar. 7, 2023, 17 pages.

Yu, et al., "MIMO Adaptive Beamforming for Nonseparable Multipath Clutter Mitigation", IEEE Transactions on Aerospace and Electronic Systems, vol. 50, No. 4, Oct. 2014, pp. 2604-2618.

Zhang, et al., "Flexible Array Response Control via Oblique Projection", IEEE Transactions on Signal Processing, vol. 67, No. 12, Jun. 15, 2019, pp. 3126-3139.

* cited by examiner

RADAR SYSTEM WITH SPARSE PRIMARY ARRAY AND DENSE AUXILIARY ARRAY

CROSS-REFERENCE TO RELATED APPLICATION

This application claims the benefit under 35 U.S.C. 119(e) of U.S. Provisional Application No. 63/091,193, filed Oct. 13, 2020, the disclosure of which is hereby incorporated by reference in its entirety herein.

BACKGROUND

Radar systems use antennas to transmit and receive electromagnetic (EM) signals for detecting and tracking objects. In automotive applications, radar antennas can include a linear array of elements to measure azimuth or elevation angles associated with nearby objects. The angular resolution of such a radar system is generally proportional to the aperture size of the linear array. A large aperture with a linear array can require many antenna elements, which increases cost, or larger spacing among the antenna elements, which may introduce aliasing in angles (e.g., grating lobes). It is desirable to maintain the angular resolution of radar systems without significant cost increases or introducing aliasing.

SUMMARY

This document describes techniques and components of a radar system with a sparse primary array and a dense auxiliary array. Even with fewer antenna elements than a traditional radar system, an example radar system has a comparable angular resolution but at a lower cost, lower complexity level, and without aliasing. The radar system includes a processor and an antenna array that can receive electromagnetic energy reflected by one or more objects. The antenna array includes a primary subarray and an auxiliary subarray. The auxiliary subarray includes multiple antenna elements with a smaller spacing than the antenna elements of the primary subarray. The processor can determine, using the received electromagnetic energy, first and second potential angles associated with the one or more objects. The processor then associates, using the first and second potential angles, respective angles associated with each of the one or more objects.

This document also describes methods performed by the above-summarized system and other configurations of the radar system set forth herein, as well as means for performing these methods.

This Summary introduces simplified concepts related to a radar system with a sparse primary array and a dense auxiliary array, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a radar system with a sparse primary array and a dense auxiliary array are described in this document with reference to the following figures. The same numbers are often used throughout the drawings to reference like features and components.

DETAILED DESCRIPTION

Overview

Figure 1:
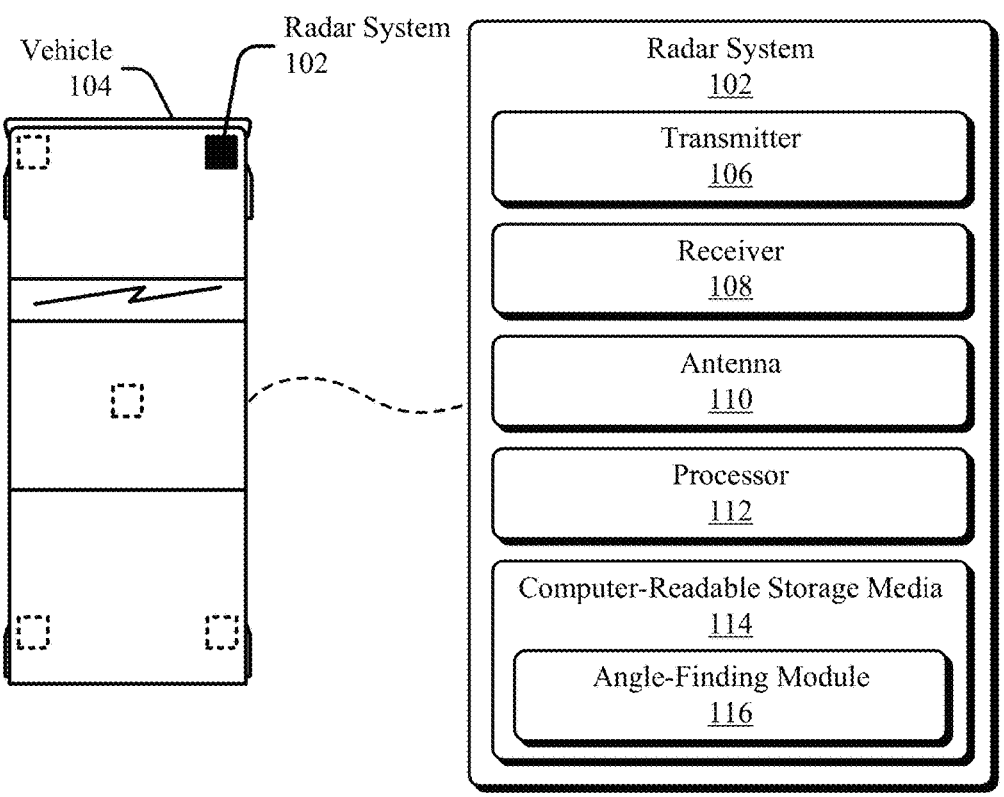
FIG. 1 illustrates an example environment in which a radar system with a sparse primary array and a dense auxiliary array can be implemented.
Figure 1:
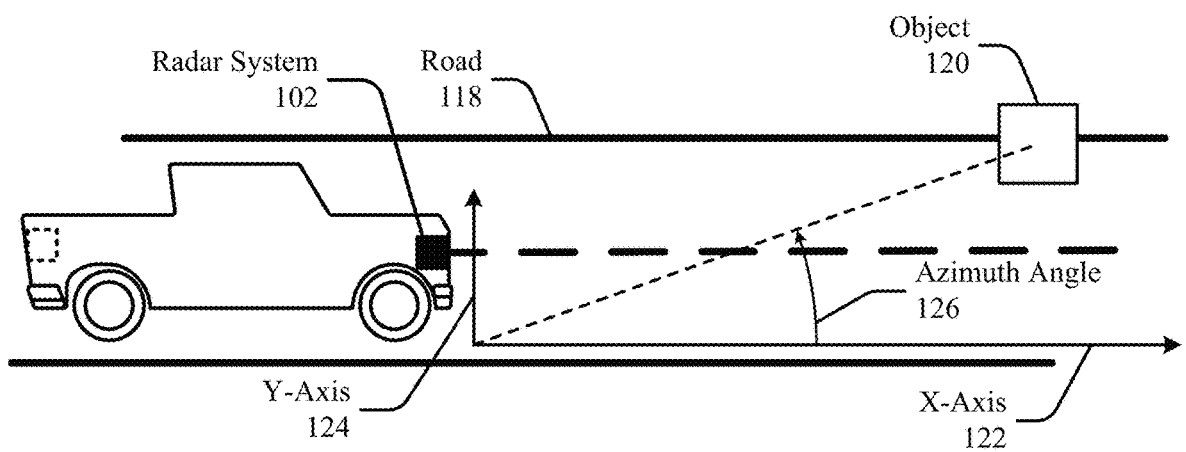

Radar systems are an essential sensing technology that vehicle systems rely on to acquire information about the surrounding environment. Radar systems generally include at least two antennas to transmit and receive EM radiation. Some radar systems include at least one receive antenna with one or more linear arrays of antenna elements to measure the azimuth and/or elevation angles associated with objects. A large aperture in the azimuth or elevation direction can increase the number of antenna elements and the cost of the radar system.

Some radar systems include a receive antenna with one or more uniform linear arrays of antenna elements. A uniform linear array can provide a large aperture to achieve smaller beam widths and improved angular resolution. The Nyquist-Shannon sampling theorem can be used during design to limit the spacing of the antenna elements in linear arrays and to avoid introducing aliasing effects within the field-of-view. Due to these restrictions, larger apertures generally result in a greater number of antenna elements. Radar systems in automotive applications, however, often have a small number of antenna channels available, which results in low angular resolution.

Other radar systems include a receive antenna with a sparse array of antenna elements. In such radar systems, the sparse array can have the same aperture as a dense array but removes antenna elements to reduce the number of antenna elements. The greater the number of removed antenna elements in the sparse array, the greater the number of potentially aliased angles. Although such radar systems generally include fewer antenna elements than dense arrays, the angle-finding processing for these systems is too complicated for many applications, including automotive applications. In particular, such radar systems require complex processing methods or multiple data snapshots to suppress aliasing and detect small objects. Because these processing methods generally cannot be processed in real time and automotive radar systems generate a single snapshot as the vehicle moves, these methods are generally not available for automotive applications.

In contrast, this document describes techniques and systems to provide a receive antenna array with a sparse primary subarray and a dense auxiliary subarray. The primary subarray includes multiple first antenna elements, and the auxiliary subarray includes multiple second antenna elements that have a smaller spacing than the first antenna elements. The sparse primary subarray provides the radar system with improved angular resolution. The dense auxiliary subarray provides angular de-aliasing. In this way, the described systems and techniques can reduce the number of antenna elements, cost, and computational complexity.

The radar system determines, using EM energy received at the primary subarray and the auxiliary subarray, first potential angles and second potential angles, respectively, associated with one or more objects. The radar system can then associate the first and second potential angles with respective angles associated with each of the one or more objects. In this way, the computational complexity for the described radar system to associate the first potential angles and second potential angles to respective objects is similar to the computational complexity for a conventional radar system with linear subarrays. Radar systems can apply the described angle-finding techniques to various configurations of a sparse primary array and a dense auxiliary array.

This is just one example of the described techniques and systems of a radar antenna array with a sparse primary array and a dense auxiliary array. This document describes other examples and implementations.

Operating Environment

FIG. 1 illustrates an example environment 100 in which a radar system 102 with a sparse primary array and a dense auxiliary array can be implemented. In the depicted environment 100, the radar system 102 is mounted to, or integrated within, a vehicle 104. The radar system 102 can detect one or more objects 120 that are in proximity to the vehicle 104.

Although illustrated as a car, the vehicle 104 can represent other types of motorized vehicles (e.g., a motorcycle, a bus, a tractor, a semi-trailer truck), non-motorized vehicles (e.g., a bicycle), railed vehicles (e.g., a train), watercraft (e.g., a boat), aircraft (e.g., an airplane), or spacecraft (e.g., satellite). In general, manufacturers can mount the radar system 102 to any moving platform, including moving machinery or robotic equipment.

In the depicted implementation, the radar system 102 is mounted on the front of the vehicle 104 and illuminates the object 120. The radar system 102 can detect the object 120 from any exterior surface of the vehicle 104. For example, vehicle manufacturers can integrate the radar system 102 into a bumper, side mirror, headlights, rear lights, or any other interior or exterior location where the object 120 requires detection. In some cases, the vehicle 104 includes multiple radar systems 102, such as a first radar system 102 and a second radar system 102, that provide a larger instrument field-of-view. In general, vehicle manufacturers can design the locations of one or more radar systems 102 to provide a particular field-of-view that encompasses a region of interest. Example fields-of-view include a 360-degree field-of-view, one or more 180-degree fields-of-view, one or more 90-degree fields-of-view, and so forth, which can overlap into a field-of-view of a particular size.

The object 120 is composed of one or more materials that reflect radar signals. Depending on the application, the object 120 can represent a target of interest. In some cases, the object 120 can be a moving object (e.g., another vehicle) or a stationary object (e.g., a roadside sign).

The radar system 102 emits EM radiation by transmitting EM signals or waveforms via antenna elements. In the environment 100, the radar system 102 can detect and track the object 120 by transmitting and receiving one or more radar signals. For example, the radar system 102 can transmit EM signals between 100 and 400 gigahertz (GHz), between 4 and 100 GHz, or between approximately 70 and 80 GHz.

The radar system 102 can include a transmitter 106 and at least one antenna 110 to transmit EM signals. The radar system 102 can also include a receiver 108 and the at least one antenna 110 to receive reflected versions of the EM signals. The transmitter 106 includes one or more components for emitting the EM signals. The receiver 108 includes one or more components for detecting the reflected EM signals. Manufacturers can incorporate the transmitter 106 and the receiver 108 together on the same integrated circuit (e.g., configured as a transceiver) or separately on different integrated circuits.

The radar system 102 also includes one or more processors 112 (e.g., an energy processing unit) and computer-readable storage media (CRM) 114. The processor 112 can be a microprocessor or a system-on-chip. The processor 112 can execute instructions stored in the CRM 114. For example, the processor 112 can process EM energy received by the antenna 110 and determine, using an angle-finding module 116, a location of the object 120 relative to the radar system 102. The processor 112 can also generate radar data for at least one automotive system. For example, the processor 112 can control, based on processed EM energy from the antenna 110, an autonomous or semi-autonomous driving system of the vehicle 104.

The angle-finding module 116 obtains EM energy received by the antenna 110 and determines azimuth angles and/or elevation angles associated with the object 120. The radar system 102 can implement the angle-finding module 116 as instructions in the CRM 114, hardware, software, or a combination thereof that is executed by the processor 112.

The radar system 102 can determine a distance to the object 120 based on the time it takes for the EM signals to travel from the radar system 102 to the object 120 and from the object 120 back to the radar system 102. The radar system 102 can also determine, using the angle-finding module 116, a location of the object 120 in terms of an azimuth angle 126 and/or an elevation angle (not illustrated in FIG. 1) based on the direction of a maximum-amplitude echo signal received by the radar system 102.

As an example, FIG. 1 illustrates the vehicle 104 traveling on a road 118. The radar system 102 detects the object 120 in front of the vehicle 104. The radar system 102 can define a coordinate system with an x-axis 122 (e.g., in a forward direction along the road 118) and a y-axis 124 (e.g., perpendicular to the x-axis 122 and along a surface of the road 118). The radar system 102 can locate the object 120 in terms of the azimuth angle 126 and/or the elevation angle. The azimuth angle 126 can represent a horizontal angle from the x-axis 122 to the object 120. The elevation angle can represent a vertical angle from the surface of the road 118 (e.g., a plane defined by the x-axis 122 and the y-axis 124) to the object 120.

The vehicle 104 can also include at least one automotive system that relies on data from the radar system 102, such as a driver-assistance system, an autonomous-driving system, or a semi-autonomous-driving system. The radar system 102 can include an interface to an automotive system that relies on the data. For example, the processor 112 outputs, via the interface, a signal based on EM energy received by the antenna 110.

Generally, the automotive systems use radar data provided by the radar system 102 to perform a function. For example, the driver-assistance system can provide blind-spot monitoring and generate an alert that indicates a potential collision with the object 120 that is detected by the radar system 102. The radar data from the radar system 102 indicates when it is safe or unsafe to change lanes in such an implementation. The autonomous-driving system may move the vehicle 104 to a particular location on the road 118 while avoiding collisions with the object 120 detected by the radar system 102. The radar data provided by the radar system 102 can provide information about a distance to and the location of the object 120 to enable the autonomous-driving system to perform emergency braking, perform a lane change, or adjust the speed of the vehicle 104.

FIGS. 2A through 2D illustrate example antenna arrays 200, in particular antenna arrays 200-1, 200-2, 200-3, and 200-4, with a sparse primary linear array and a dense auxiliary linear array. The antenna arrays 200 are examples of the antenna 110 of the radar system 102 in FIG. 1, with similar components.

Figure 2A:
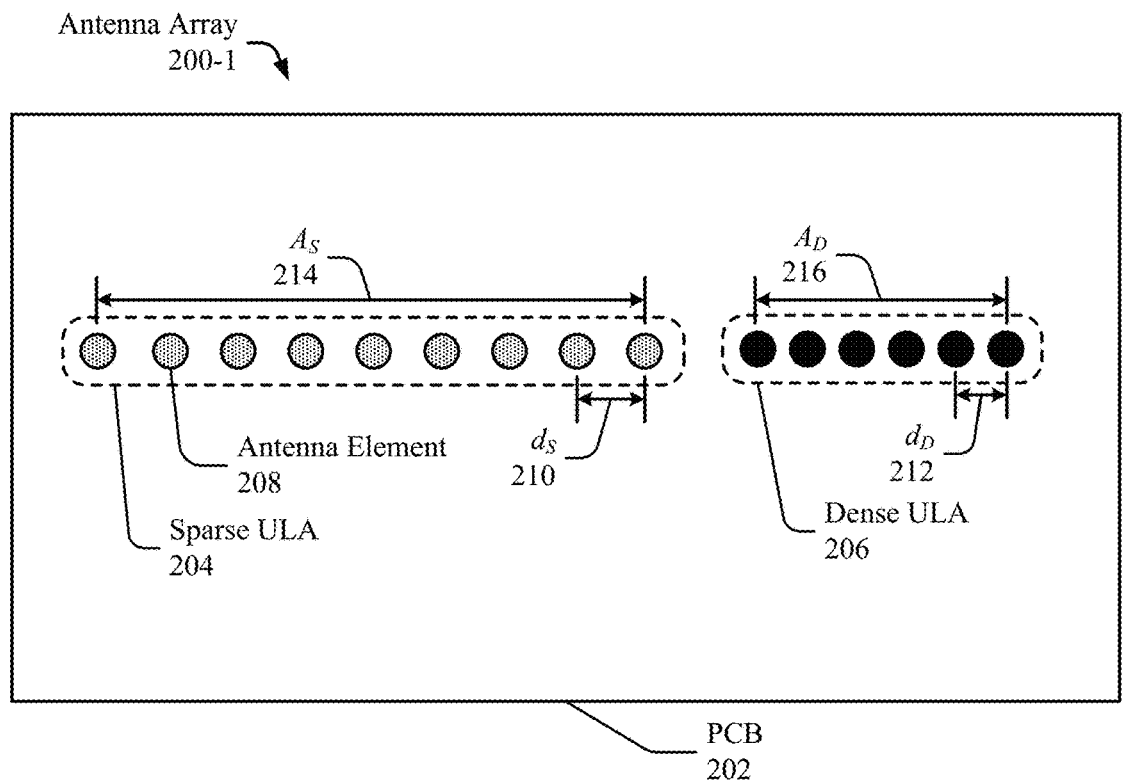
FIGS. 2A-2D illustrate example antenna arrays with a sparse primary linear array and a dense auxiliary linear array.
Figure 2B:
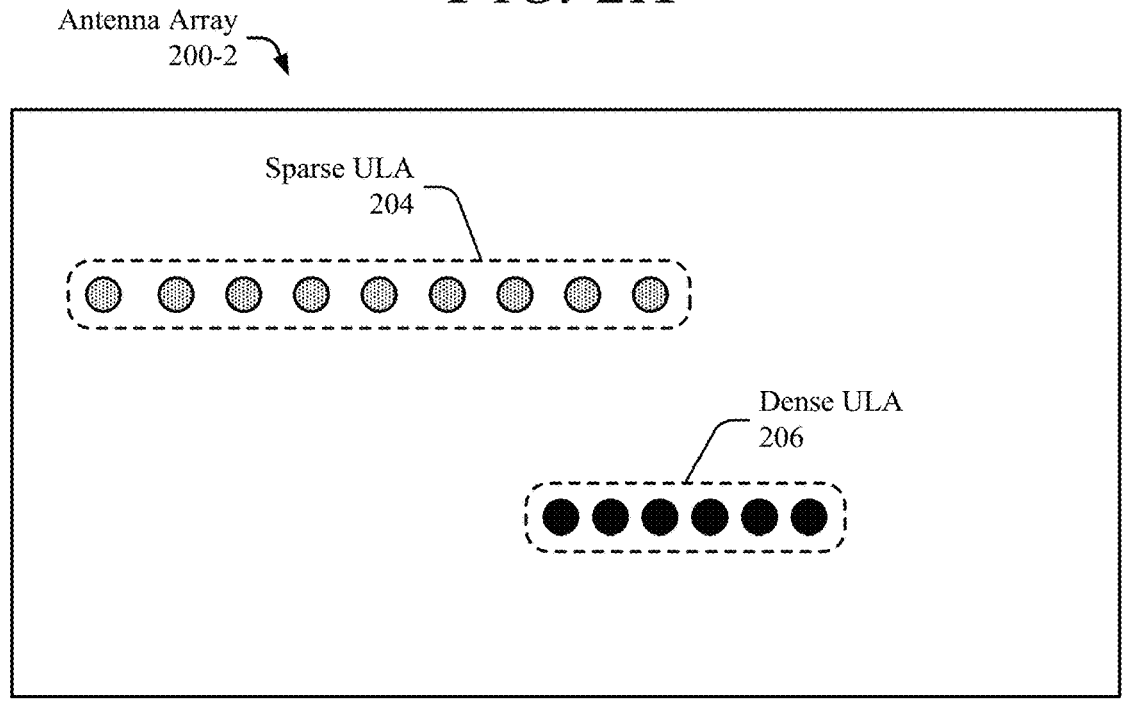
Figure 2C:
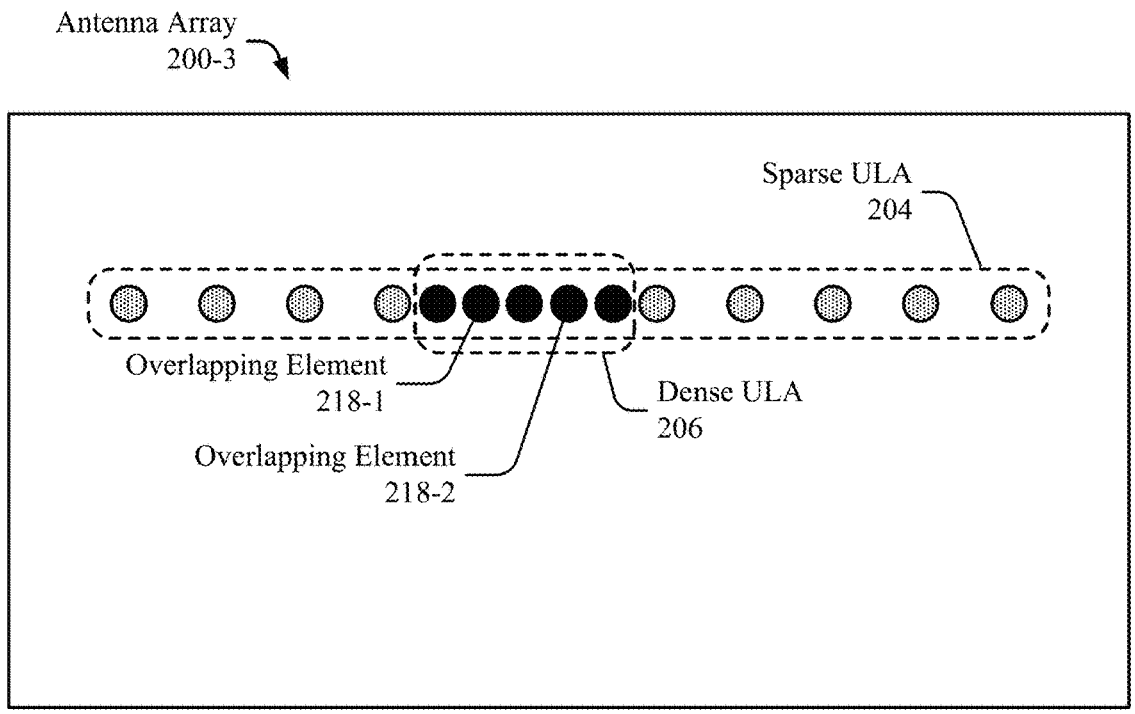
Figure 2D:
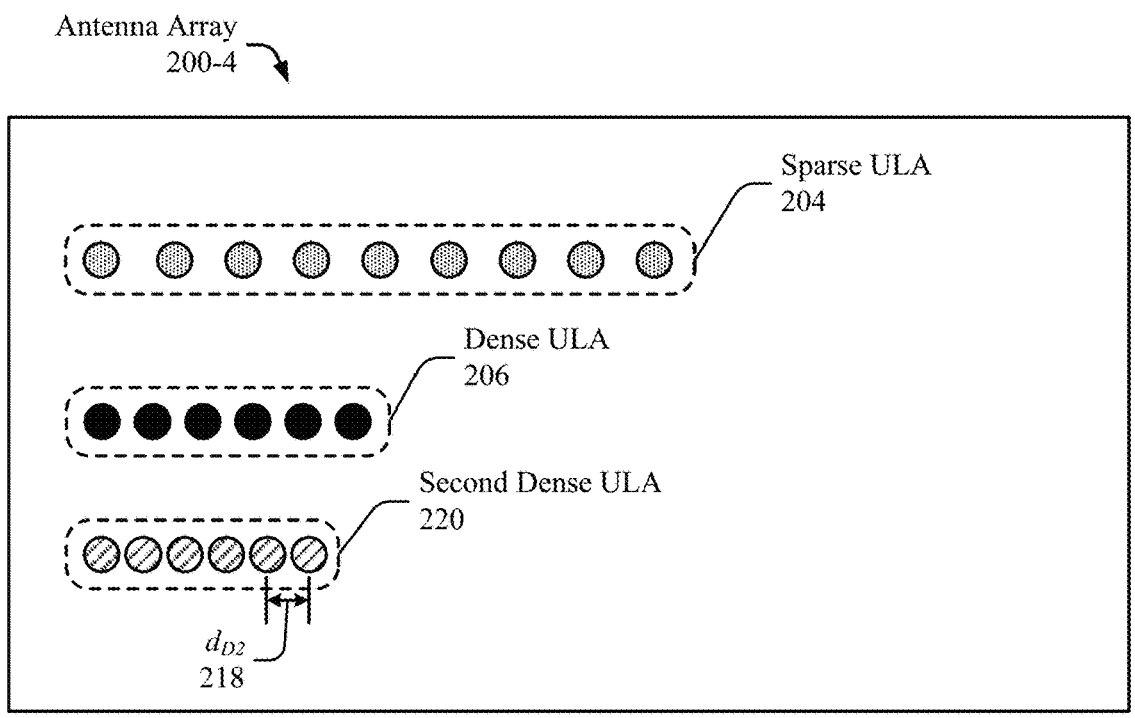

In the depicted implementations, the antenna arrays 200 include a sparse uniform linear array (ULA) 204 as the primary linear array and a dense ULA 206 as the auxiliary linear array on a printed circuit board (PCB) 202. In some implementations, the antenna array 200 can include additional dense ULAs (e.g., second dense ULA 220), as illustrated in FIG. 2D. In operation, the antenna arrays 200 can receive EM energy reflected by one or more objects 120.

The sparse ULA 204 and the dense ULA 206 are positioned in an azimuth direction in the depicted implementations. The sparse ULA 204 and the dense ULA 206 may be positioned in an elevation direction in other implementations, depending on the application or intended use. The antenna array 200 can include sparse ULAs 204 and dense ULAs 206 that are positioned in both an azimuth direction and an elevation direction, in yet other implementations.

The sparse ULA 204 and the dense ULA 206 can be arranged in various positions or orientations. For example, the dense ULA 206 can be offset from the sparse ULA 204 in an azimuth direction, as illustrated in FIG. 2A; in an elevation direction, as illustrated in FIG. 2D; or in both an azimuth direction and an elevation direction, as illustrated in FIG. 2B. The sparse ULA 204 and the dense ULA 206 can overlap, as illustrated in FIG. 2C, with some overlapping antenna elements 214 (e.g., overlapping element 218-1, overlapping element 218-2) shared by both the sparse ULA 204 and the dense ULA 206. The antenna elements 208 of the sparse ULA 204 and the dense ULA 206 may generally be positioned at different relative locations as long as the far-field planar incident wave assumption is satisfied.

The sparse ULA 204 and the dense ULA 206 can include physical, digital, or synthetic arrays of receiver antenna elements. The sparse ULA 204 and the dense ULA 206 can also form various phased-array radar systems, including a multiple-input multiple-output (MIMO) radar. MIMO radar systems generally employ digital receiver arrays distributed across an aperture, with antenna elements 208 generally closely located to obtain a better spatial resolution, Doppler resolution, and dynamic range.

In some cases, the antenna elements 208 of the sparse ULA 204 and the dense ULA 206 can be arranged in other configurations and positions. For example, the antenna array 200 can include the second dense ULA 220, as illustrated in FIG. 2D, or additional dense ULAs. In other implementations, the sparse ULA 204 and the dense ULA 206 can be replaced with non-uniform linear arrays and utilize interpolation and other algorithms than those disclosed below to determine the angles of the objects 120. The sparse ULA 204 and the dense ULA 206 may be arranged to optimize range or range-rate detections.

The sparse ULA 204, the dense ULA 206, and the second dense ULA 220 include multiple antenna elements 208. The sparse ULA 204 can include M antenna elements 208. The dense ULA 206 can include N antenna elements 208, where N is generally equal to or less than M. In automotive applications, the number of antenna elements 208 in the dense ULA 206 is generally greater than an anticipated maximum number of objects 120 to be detected by the radar system 102.

In the depicted implementations, the sparse ULA 204 includes nine antenna elements 208, the dense ULA 206 includes six antenna elements 208, and the second dense ULA 220 includes six antenna elements 208. The antenna elements 208 in the sparse ULA 204 are separated by a sparse spacing 210, $d_S$. Similarly, the antenna elements 208 in the dense ULA 206 are separated by a dense spacing 212, $d_D$. The sparse spacing 210 is larger than the dense spacing 212 (e.g., $d_S > d_D$). The sparse ULA 204 has a sparse aperture 214, As, and the dense ULA 206 has a dense aperture 216, $A_D$. The dense aperture 216 is generally smaller than the sparse aperture 214.

In some implementations, the ratio of the sparse spacing 210 to the dense spacing 212 is equal to an integer (e.g., $K = d_S/d_D$), where K is an integer. In other implementations, the ratio of the sparse spacing 210 to the dense spacing 212 is equal to a factor of two (e.g., $2^n = d_S/d_D$), where n is a positive integer (e.g., n=1, 2, 3, 4, 5, etc.).

The angle coverage (e.g., field-of-view), θ, of the dense ULA 206 can be calculated using the dense spacing 212, $d_D$, as shown in Equation 1:

$$-\sin^{-1}\left(\frac{\lambda}{2d_D}\right) \leq \theta \leq \sin^{-1}\left(\frac{\lambda}{2d_D}\right), \quad (1)$$

where λ is the wavelength of the EM energy transmitted by the dense ULA 206. Table 1 below lists the angle coverage for the dense ULA 206 as a function of the dense spacing 212 and wavelength.

TABLE 1

| Dense Distance 212 | Angle Coverage |
| --- | --- |
| 0.5λ | ±90° |
| 1λ | ±30° |
| 1.5λ | ±19.47° |
| 2λ | ±14.48° |
| 2.5λ | ±11.540° |
| 3λ | ±9.59° |
| 3.5λ | ±8.21° |
| 4λ | ±7.18° |

As a result, the desired angle coverage can be used to define or set the value of the dense spacing 212.

After selecting the dense spacing 212, the sparse spacing 210 can be selected based on the value of K, which represents the number of aliased angles from the sparse ULA 204. If the value of K is too large, the possibility of inaccurate de-aliasing can be high. In general, the value of K, which represents the ratio of the sparse spacing 210 to the dense spacing 212, should be less than 10.

The sparse ULA 204, the dense ULA 206, and the second dense ULA 220 can be planar arrays that provide high gain and low loss. Planar arrays are well-suited for vehicle integration due to their small size. For example, the antenna elements 208 can be slots etched or otherwise formed in a plating material of one surface of the PCB 202 for a substrate-integrated waveguide (SIW) antenna. The antenna elements 208 can also be part of an aperture antenna, a microstrip antenna, or a dipole antenna. For example, the sparse ULA 204, the dense ULA 206, and the second dense ULA 220 can include subarrays of patch elements (e.g., microstrip patch antenna subarrays) or dipole elements. The sparse ULA 204, the dense ULA 206, and the second dense ULA 220 can be synthetic aperture arrays in other implementations.

Figure 3:
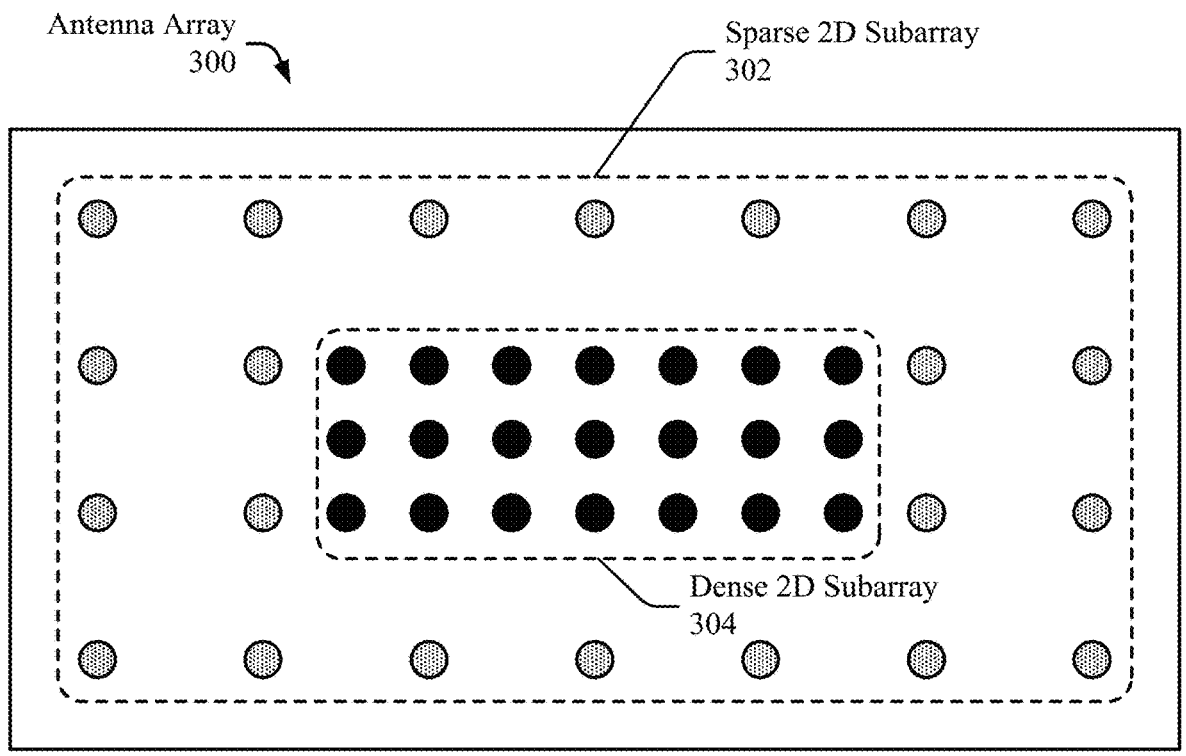
FIG. 3 illustrates an example antenna array with a sparse primary two-dimensional array and a dense auxiliary two-dimensional array.

FIG. 3 illustrates an example antenna array 300 with a sparse two-dimensional (2D) subarray 302 and a dense auxiliary 2D subarray 304. The antenna array 300 is an example of the antenna 110 of the radar system 102 in FIG. 1, with similar components. In operation, the antenna array 300 can receive EM energy reflected by one or more objects 120.

In the depicted implementation, the sparse 2D subarray 302 and the dense 2D subarray 304 include antenna subarrays positioned in both the azimuth and elevation directions. The antenna elements of the dense 2D subarray 304 overlap with those of the sparse 2D subarray 302. In other implementations, the dense 2D subarray 304 and the sparse 2D subarray 302 may be arranged in various other positions. For example, the dense 2D subarray 304 can partially overlap with the sparse 2D subarray 302 or not overlap at all.

Figure 4:
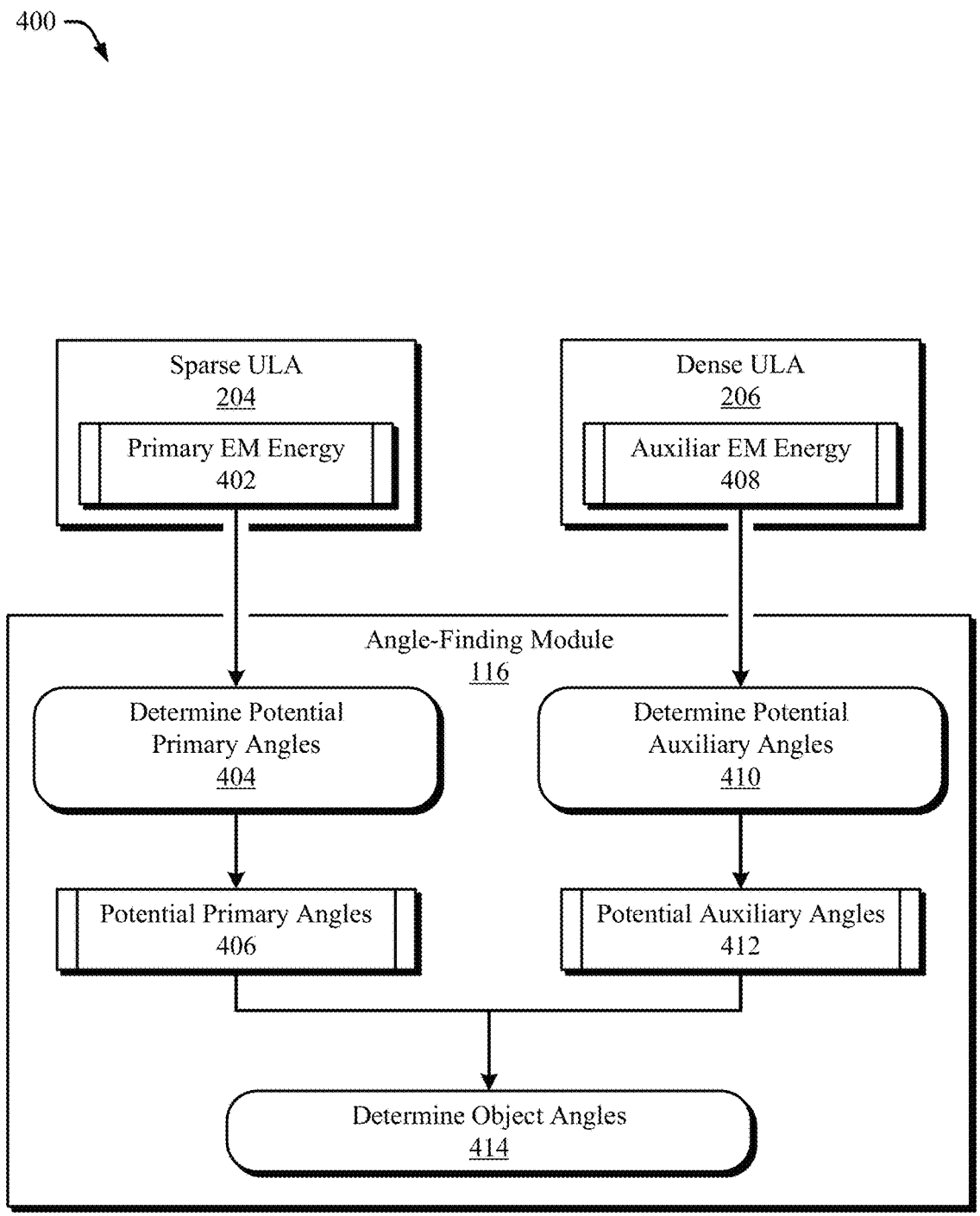
FIG. 4 illustrates an example conceptual diagram of a radar system with a sparse primary array and a dense auxiliary array.

FIG. 4 illustrates an example conceptual diagram 400 of the radar system 102 with a sparse linear array and a dense auxiliary linear array. The radar system 102 of FIG. 4 can, for example, be the radar system 102 of FIG. 1. In the depicted implementation, the radar system 102 includes the sparse ULA 204 and the dense ULA 206, which can be arranged in various positions, including the arrangements illustrated in FIGS. 2A through 3.

The sparse ULA 204 can generally achieve a high angular resolution and accuracy. In some situations, the sparse ULA 204 can obtain better angular resolution and accuracy than a dense array with 0.5λ spacing with the same aperture. The angle estimates of the sparse ULA 204, however, can be aliased and appear on multiple angle regions. In contrast, the dense ULA 206 can provide unaliased angle estimates with lower angular resolution and accuracy than the sparse ULA 204. As described below with respect to FIGS. 5 and 6, the radar system 102 can use the angle estimates from the dense ULA 206 to identify the correct angles for the objects 120. In this way, the described systems and techniques combine the benefits of both the sparse ULA 204 and the dense ULA 206.

At 404, the angle-finding module 116 obtains primary EM energy 402 received by the sparse ULA 204 and determines potential primary angles 406 associated with one or more objects 120. The potential primary angles 406 include $\theta_1$, $\theta_2$, ..., $\theta_{N_P}$, where $N_P$ represents the number of objects detected by the sparse ULA 204.

At 410, the angle-finding module 116 obtains auxiliary EM energy 408 received by the dense ULA 206 and determines potential auxiliary angles 412 associated with the one or more objects 120. The potential auxiliary angles 412 include $\varphi_1, \varphi_2, \ldots, \varphi_{N_A}$, where $N_A$ represents the number of objects detected by the auxiliary ULA 206. Because the sparse ULA 204 and the dense ULA 206 have different apertures and resolutions, the number of potential primary objects, $N_P$, can be different than the number of potential auxiliary objects, $N_A$. For example, the potential primary angles 406 can include two peaks (e.g., potential objects) within a single angle interval for the potential auxiliary angles 412.

The angle-finding module 116 can use various angle-finding functions to determine the potential primary angles 406 and the potential auxiliary angles 412 from the primary EM energy 402 and the auxiliary EM energy 408, respectively. As non-limiting examples, the angle-finding module 116 can use a pseudo-spectrum function, including an Estimation of Signal Parameters via Rotational Invariance Technique (ESPRIT), Space-Alternating Generalized Expectation-maximization (SAGE), Delay-and-Sum (DS), Minimum Variance Distortionless Response (MVDR), and/or a Multiple Signal Classification (MUSIC) based-function, to calculate the direction of arrival of the EM signals received by the primary ULA 204 and the auxiliary ULA 206. The angle-finding module 116 can determine the potential primary angles 406 and the potential auxiliary angles 412 with relatively low processing complexity and cost.

At 414, the angle-finding module 116 determines, using the potential primary angles 406 and the potential auxiliary angles 412, the angle associated with the objects 120. In particular, the angle-finding module 116 determines the azimuth or elevation angle associated with each of the one or more objects 120. The association of the azimuth or elevation angles to the objects 120 is described in greater detail with respect to FIG. 5.

Figure 5:
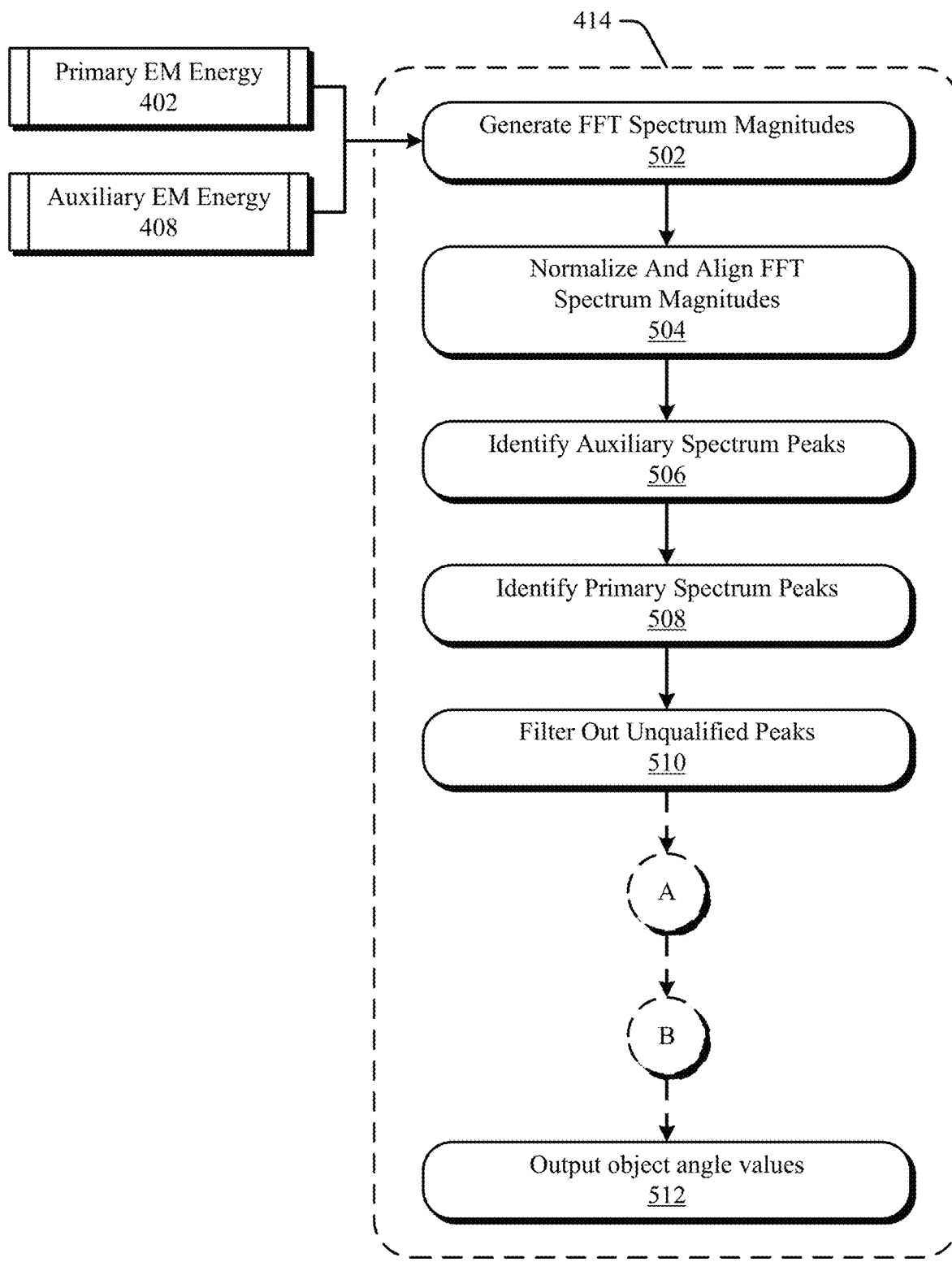
FIG. 5-6 illustrate example conceptual diagrams of an angle-finding module to determine angles of nearby objects based on EM energy received by a sparse primary array and a dense auxiliary array.

FIG. 5 illustrates an example conceptual diagram 414 of the angle-finding module 116 to determine the angles associated with the objects 120. The angle-finding module 116 of FIG. 5 can, for example, be the angle-finding module 116 of FIGS. 1 through 4. In particular, the angle-finding module 116 determines the angles associated with the objects 120 using synthetic fast Fourier transform (FFT) spectrums from the primary EM energy 402 and the auxiliary EM energy 408. Because the primary ULA 204 and the auxiliary ULA 206 are uniform linear arrays, the angle-finding module 116 can use FFT spectrums with a pre-defined window (e.g., a Chebyshev window) to suppress sidelobes.

At 502, the angle-finding module 116 generates FFT spectrum magnitudes for the primary ULA 204 and the auxiliary ULA 206 using the primary EM energy 402 and the auxiliary EM energy 408, respectively. For example, the angle-finding module 116 can generate the FFT spectrum for the primary EM energy 402 and the auxiliary EM energy 408. The angle-finding module 116 can then generate an unfolded FFT spectrum for the primary EM energy 402 and the auxiliary EM energy 408.

At 504, the angle-finding module 116 normalizes and aligns the FFT spectrums or the unfolded FFT spectrums for the sparse ULA 204 and the dense ULA 206. For example, the angle-finding module 116 can align both FFT spectrums according to the detected potential primary angles 406 and the potential auxiliary angles 412. The angle-finding module 116 can identify the potential angles as the magnitude peaks in the FFT spectrums.

At 506, the angle-finding module 116 identifies auxiliary spectrum peaks. For example, the angle-finding module 116 can analyze the FFT spectrum for the dense ULA 206 and identify spectrum peaks above a pre-defined threshold T The angle-finding module 116 can also identify the angle areas associated with the spectrum peaks. The angle area associated with a specific auxiliary ULA spectrum peak generally spans the peak location neighborhood. The angle-finding module 116 can extend this angle area to contain possible primary ULA spectrum peaks while avoiding apparent false detections.

The pre-defined threshold T can be related to the signal-to-noise ratio (SNR) for the dense ULA 206 and/or the sidelobe level from a pre-defined window function applied in the FFT. In general, the higher the SNR of the dense ULA 206, the lower the pre-defined threshold T can be set. The pre-defined threshold T generally cannot exceed the dynamic range of the dense ULA 206.

At 508, the angle-finding module 116 identifies primary spectrum peaks. For example, the angle-finding module 116 can analyze the FFT spectrum for the sparse ULA 204 and identify spectrum peaks above the pre-defined threshold T. The angle-finding module 116 identifies the primary spectrum peaks in angle areas associated with the auxiliary spectrum peaks.

At 510, the angle-finding module 116 filters out unqualified spectrum peaks. For example, the angle-finding module 116 can evaluate the auxiliary spectrum and the primary spectrum at locations for the primary spectrum peaks. The angle-finding module 116 can compare the magnitude, slope, or a combination thereof of the candidate peaks to remove unexpected peaks and reduce the computational burden of further processing. The angle-finding module 116 can also evaluate additional aspects of the candidate peaks to remove unexpected peaks.

In some implementations, the angle-finding module 116 can perform an orthogonal matching pursuit (OMP) procedure to further process the spectrums at optional operation A. The output of the OMP procedure is provided at operation B. The operation of the angle-finding module 116 to perform the OMP procedure is described in greater detail with respect to FIG. 6.

At 512, the angle-finding module 116 outputs object angles for the nearby objects 120. For example, the angle-finding module 116 can output continuous angle values associated with the final peaks through interpolation. When the ratio of the sparse spacing 210 to the dense spacing 212 is equal to a factor of two (e.g., $2^n = d_S/d_D$), the angle-finding module 116 can efficiently implement the described synthetic FFT spectrum processing due to the length of the FFT being a power of two. For other spacing ratios, the angle-finding module 116 may need to use interpolation to align the grid points of the primary spectrum and the auxiliary spectrum.

Figure 6:
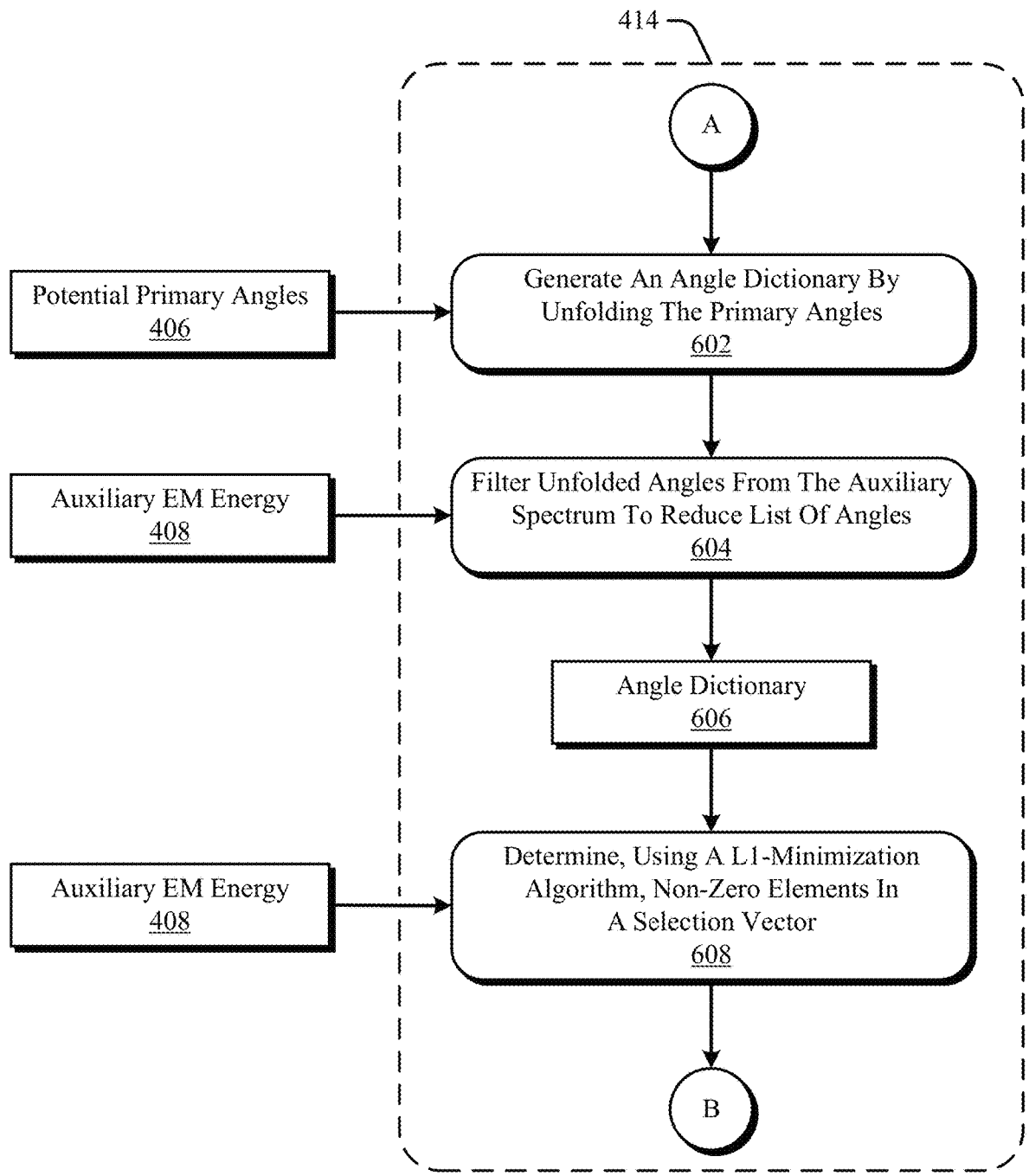

FIG. 6 illustrates additional operations of the conceptual diagram 414 for the angle-finding module 116 to determine the angles associated with the objects 120. The angle-finding module 116 determines the angles associated with the objects 120 using an OMP procedure. Because the angular resolution of the dense ULA 206 is worse than that of the sparse ULA 204, unfolding errors can exist in the FFT spectrum. The angle-finding module 116 can use the OMP procedure to resolve the object angles in such cases.

At 602, the angle-finding module 116 can generate an angle dictionary by unfolding the potential primary angles 406. As discussed above, the potential primary angles 406 include $\theta_1, \theta_2, \ldots, \theta_{N_P}$. For example, the angle-finding module 116 can unfold the primary angles 406 $\theta_1, \theta_2, \ldots, \theta_{N_P}$ to the unfolded angles $\theta_{1,1}, \theta_{2,1}, \ldots, \theta_{N_P,1}, \theta_{N_P,K}$ for the K intervals.

At 604, the angle-finding module 116 can filter the unfolded angles from the auxiliary spectrum to reduce the list of potential primary angles 406. For example, the angle-finding module 116 can filter the unfolded angles $\theta_{1,1}, \theta_{2,1}, \ldots, \theta_{N_P,1}, \ldots, \theta_{N_P,K}$ from the auxiliary spectrum with filter windows. In this way, the angle-finding module 116 can reduce the list of potential primary angles to $\theta_1, \theta_2, \ldots, \theta_M$ and construct an angle dictionary 606 for this list of angles:

$$A = [a(\theta_1), a(\theta_2), \ldots, a(\theta_M)] \quad (2)$$

Each column of the angle dictionary 606 is the steering vector for one angle.

At 608, the angle-finding module 116 determines, using an L1-minimization-based function and the auxiliary EM energy 408, non-zero elements in a selection vector. The non-zero elements in the selection vector represent the object angles of the angle dictionary 606 that correspond to the angles of the respective objects 120. The angle-finding module 116 can use the following equation to identify the angles:

$$y = Ax + \eta \quad (3)$$

where the K×1 vector y represents the measured beam vector of the auxiliary EM energy 408 received by the dense ULA 206, the vector x represents a sparse vector, and the vector $\eta$ represents measurement noise. The angle-finding module 116 considers x as the selection vector. The steering vectors in A corresponding to the non-zero elements in x represent the actual angles.

The angle-finding module 116 can solve for the selection vector x in Equation (3) by solving the following L1-minimization:

$$\hat{x} = \underset{x}{\mathrm{argmin}} \|x\|_1, \quad (4)$$
$$\text{s.t.} \ \|y - Ax\|_2 \leq \varepsilon$$

where $\varepsilon$ bounds the amount of noise in the data. The angle-finding module 116 can solve Equation (4) using, for example, an Orthogonal Matching Pursuit (OMP) based-function.

Example Method

Figure 7:
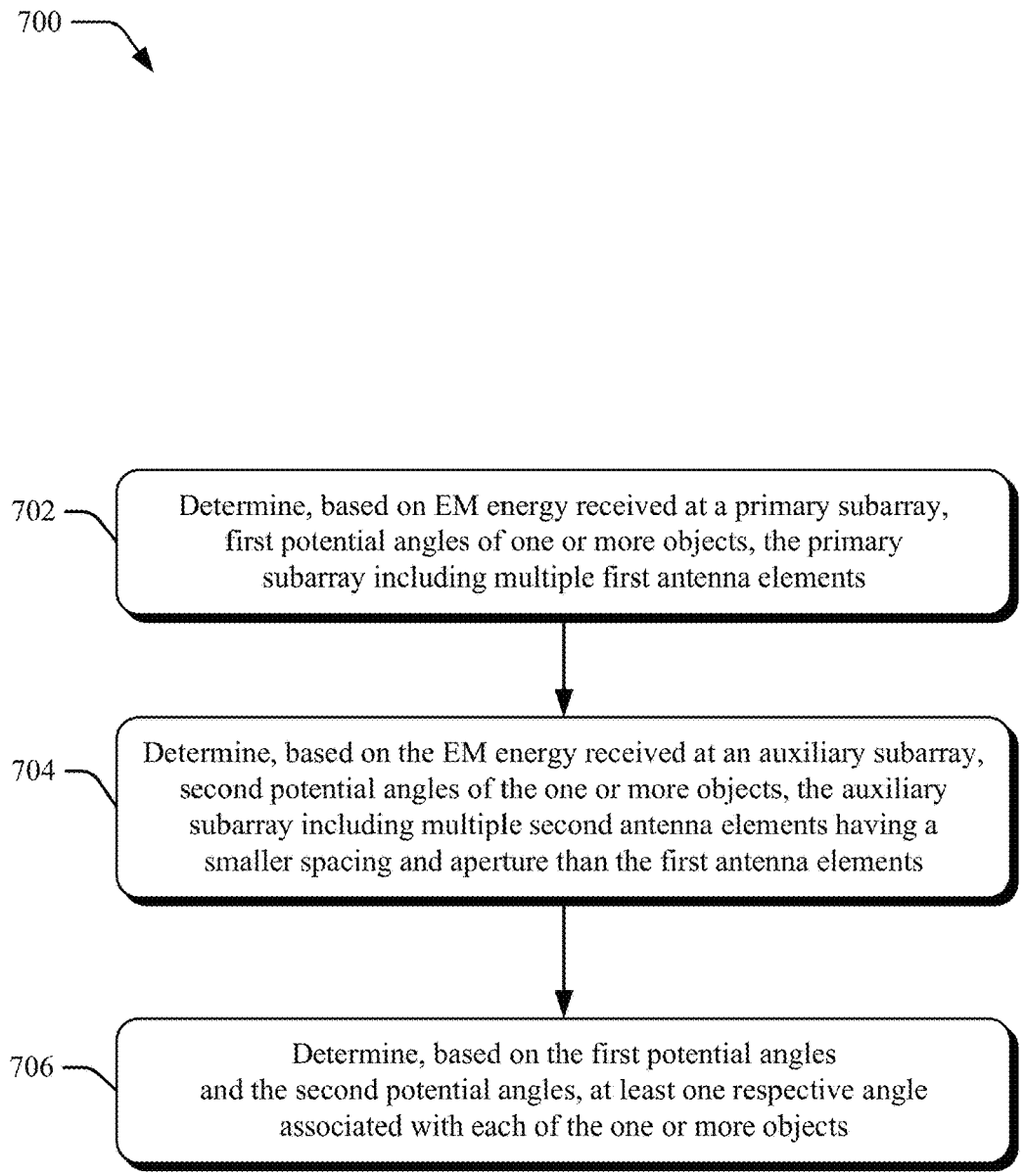
FIG. 7 illustrates a flow diagram of an example method of a radar system with a sparse primary array and a dense auxiliary array.

FIG. 7 illustrates a flow diagram of an example method 700 of the radar system 102 with a sparse linear array and a dense auxiliary linear array. Method 700 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 1 through 6, reference to which is made for example only. The techniques are not limited to performance by one entity or multiple entities.

At 702, one or more processors of a radar system determines, based on EM energy that is received at a primary sub array of an antenna array, first potential angles of one or more objects that are reflecting the EM energy to the antenna array. The primary subarray includes multiple first antenna elements. For example, the sparse ULA 204 of the antenna 110 receives EM energy reflected by one or more objects 120. The processor 112 of the radar system 102 determines, based on the primary EM energy 402 received by the sparse ULA 204, potential primary angles 406 of the one or more objects 120. The sparse ULA 204 includes M antenna elements 208.

At 704, the processor of the radar system determines, based on EM energy that is received at an auxiliary subarray of the antenna array, second potential angles of the one or more objects that are reflecting the EM energy to the antenna array. The auxiliary subarray includes multiple second antenna elements. The second antenna elements have a smaller spacing than the first antenna elements. For example, the dense ULA 206 of the antenna 110 receives EM energy reflected by the one or more objects 120. The processor 112 determines, based on the auxiliary EM energy 408 received by the dense ULA 206, potential auxiliary angles 412 of the one or more objects 120. The dense ULA 206 includes N antenna elements 208, which have a smaller dense spacing $d_D$ 212 than the sparse spacing $d_S$ 210 for the antenna elements 208 of the sparse ULA 204.

At 706, the processor of the radar system determines, based on the first potential angles and the second potential angles, at least one respective angle associated with each of the one or more objects. For example, the processor 112 determines, based on the potential primary angles 406 and the potential auxiliary angles 412, at least one respective angle associated with each of the one or more objects 120. The resolution of the potential primary angles 406 and the potential auxiliary angles 412 to determine the respective object angle(s) is described in greater detail above with respect to FIGS. 4 through 6.

Examples

In the following section, examples are provided.

Example 1: A radar system comprising one or more processors configured to: determine, based on electromagnetic (EM) energy that is received at a primary subarray of an antenna array, first potential angles of one or more objects that are reflecting the EM energy to the antenna array, the primary subarray comprising multiple first antenna elements; determine, based on the EM energy that is received at an auxiliary subarray of the antenna array, second potential angles of the one or more objects, the auxiliary subarray comprising multiple second antenna elements, the second antenna elements having a smaller spacing than the first antenna elements; and determine, based on the first potential angles and the second potential angles, at least one respective angle associated with each of the one or more objects.

Example 2: The radar system of example 1, wherein in determining the at least one respective angle associated with each of the one or more objects, the one or more processors are configured to: generate, based on the EM energy that is respectively received at the primary subarray and the auxiliary subarray, fast Fourier transform (FFT) spectrum magnitudes for the primary subarray and the auxiliary subarray using an FFT with a pre-defined window; normalize and align the FFT spectrum magnitudes for the primary subarray and the auxiliary subarray; identify, based on the normalized and aligned FFT spectrum magnitudes, primary spectrum peaks and auxiliary spectrum peaks; filter out, based on at least one of a magnitude or slope, unqualified spectrum peaks from among the primary spectrum peaks and the auxiliary spectrum peaks; and output non-filtered spectrum peaks from among the primary spectrum peaks and the auxiliary spectrum peaks as the at least one respective angle associated with each of the one or more objects.

Example 3: The radar system of example 2, wherein the primary spectrum peaks and auxiliary spectrum peaks are identified as peaks from the normalized and aligned FFT spectrum magnitudes that are above a threshold value.

Example 4: The radar system of example 3, wherein the threshold value is inversely proportional to a signal-to-noise ratio of the EM energy received at the auxiliary subarray.

Example 5: The radar system of example 2, wherein in determining the at least one respective angle associated with each of the one or more objects, the one or more processors are further configured to: generate an angle dictionary by unfolding the first potential angles; filter the unfolded first potential angles from the FFT spectrum magnitudes for the auxiliary subarray to construct an angle dictionary; and determine, using an L1-minimization-based function and the EM energy that is received at the auxiliary subarray, non-zero elements in a selection vector, the non-zero elements in the selection vector representing the at least one respective angle associated with each of the one or more objects.

Example 6: The radar system of example 1, wherein the primary subarray and the auxiliary subarray are uniform linear arrays, wherein the antenna elements of the uniform linear arrays are equally spaced.

Example 7: The radar system of example 1, wherein the primary subarray is positioned in an azimuth direction, and the auxiliary subarray is positioned in line with the primary subarray in the same azimuth direction.

Example 8: The radar system of example 1, wherein the primary subarray and the auxiliary subarray are positioned in an azimuth direction, and the auxiliary subarray is positioned with an elevation offset from the primary subarray.

Example 9: The radar system of example 1, wherein the primary subarray and the auxiliary subarray are positioned in an azimuth direction, and the auxiliary subarray overlaps with at least a portion of the primary subarray.

Example 10: The radar system of example 1, wherein a quantity of the first antenna elements is greater than a quantity of the second antenna elements.

Example 11: The radar system of example 1, wherein a ratio of a spacing of the first antenna elements to a spacing of the second antenna elements is approximately equal to an integer.

Example 12: The radar system of example 11, wherein the integer is an exponential of two.

Example 13: The radar system of example 1, wherein the radar system is configured to be installed on an automobile.

Example 14: A method comprising: determining, based on electromagnetic (EM) energy that is received at a primary subarray of an antenna array, first potential angles of one or more objects that are reflecting the EM energy to the antenna array, the primary subarray comprising multiple first antenna elements; determining, based on the EM energy that is received at an auxiliary subarray of the antenna array, second potential angles of the one or more objects, the auxiliary subarray comprising multiple second antenna elements, the second antenna elements having a smaller spacing than the first antenna elements; and determining, based on the first potential angles and the second potential angles, at least one respective angle associated with each of the one or more objects.

Example 15: The method of example 14, wherein determining the at least one respective angle associated with each of the one or more objects comprises: generating, based on the EM energy that is respectively received at the primary subarray and the auxiliary subarray, fast Fourier transform (FFT) spectrum magnitudes for the primary subarray and the auxiliary subarray using an FFT with a pre-defined window; normalizing and aligning the FFT spectrum magnitudes for the primary subarray and the auxiliary subarray; identifying, based on the normalized and aligned FFT spectrum magnitudes, primary spectrum peaks and auxiliary spectrum peaks; filtering out, based on at least one of a magnitude or slope, unqualified spectrum peaks from among the primary spectrum peaks and the auxiliary spectrum peaks; and outputting non-filtered spectrum peaks from among the primary spectrum peaks and the auxiliary spectrum peaks as the at least one respective angle associated with each of the one or more objects.

Example 16: The method of example 15, wherein the primary spectrum peaks and auxiliary spectrum peaks are identified as peaks from the normalized and aligned FFT spectrum magnitudes that are above a threshold value.

Example 17: The method of example 16, wherein the threshold value is inversely proportional to a signal-to-noise ratio of the EM energy received at the auxiliary subarray.

Example 18: The method of example 15, wherein determining the at least one respective angle associated with each of the one or more objects further comprises: generating an angle dictionary by unfolding the first potential angles; filtering the unfolded first potential angles from the FFT spectrum magnitudes for the auxiliary subarray to construct an angle dictionary; and determining, using an L1-minimization-based function and the EM energy that is received at the auxiliary subarray, non-zero elements in a selection vector, the non-zero elements in the selection vector representing the at least one respective angle associated with each of the one or more objects.

Example 19: A computer-readable storage media comprising computer-executable instructions that, when executed, cause a processor of a radar system to: determine, based on electromagnetic (EM) energy that is received at a primary subarray of an antenna array, first potential angles of one or more objects that are reflecting the EM energy to the antenna array, the primary subarray comprising multiple first antenna elements; determine, based on the EM energy that is received at an auxiliary subarray of the antenna array, second potential angles of the one or more objects, the auxiliary subarray comprising multiple second antenna elements, the second antenna elements having a smaller spacing than the first antenna elements; and determine, based on the first potential angles and the second potential angles, at least one respective angle associated with each of the one or more objects.

Example 20: The computer-readable storage media of example 19, wherein the instructions, when executed, cause the processor of the radar system to determine the at least one respective angle associated with each of the one or more objects by: generating, based on the EM energy that is respectively received at the primary subarray and the auxiliary subarray, fast Fourier transform (FFT) spectrum magnitudes for the primary subarray and the auxiliary subarray using an FFT with a pre-defined window; normalizing and aligning the FFT spectrum magnitudes for the primary subarray and the auxiliary subarray; identifying, based on the normalized and aligned FFT spectrum magnitudes, primary spectrum peaks and auxiliary spectrum peaks; filtering out, based on at least one of a magnitude or slope, unqualified spectrum peaks from among the primary spectrum peaks and the auxiliary spectrum peaks; and outputting non-filtered spectrum peaks from among the primary spectrum peaks and the auxiliary spectrum peaks as the at least one respective angle associated with each of the one or more objects.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A radar system comprising one or more processors configured to:
   determine, based on electromagnetic (EM) energy that is received at a primary subarray of an antenna array, first potential angles of one or more objects that are reflecting the EM energy to the antenna array, the primary subarray comprising multiple first antenna elements;
   determine, based on the EM energy that is received at an auxiliary subarray of the antenna array, second potential angles of the one or more objects, the auxiliary subarray comprising multiple second antenna elements, the second antenna elements having a smaller spacing than the first antenna elements; and
   determine, based on the first potential angles and the second potential angles, at least one respective angle associated with each of the one or more objects by:
      generating, based on the EM energy that is respectively received at the primary subarray and the auxiliary subarray, fast Fourier transform (FFT) spectrum magnitudes for the primary subarray and the auxiliary subarray using a FFT with a pre-defined window;
      normalizing and aligning the FFT spectrum magnitudes for the primary subarray and the auxiliary subarray;
      identifying, based on the normalized and aligned FFT spectrum magnitudes, primary spectrum peaks and auxiliary spectrum peaks;
      filtering out, based on at least one of a magnitude or slope, unqualified spectrum peaks from among the primary spectrum peaks and the auxiliary spectrum peaks; and
      outputting non-filtered spectrum peaks from among the primary spectrum peaks and the auxiliary spectrum peaks as the at least one respective angle associated with each of the one or more objects.

2. The radar system of claim 1, wherein the primary spectrum peaks and auxiliary spectrum peaks are identified as peaks from the normalized and aligned FFT spectrum magnitudes that are above a threshold value.

3. The radar system of claim 2, wherein the threshold value is inversely proportional to a signal-to-noise ratio of the EM energy received at the auxiliary subarray.

4. The radar system of claim 1, wherein in determining the at least one respective angle associated with each of the one or more objects, the one or more processors are further configured to:
   generate unfolded potential angles by unfolding the first potential angles to multiple intervals;
   filter the unfolded first potential angles from the FFT spectrum magnitudes for the auxiliary subarray to construct an angle dictionary; and
   determine, using an L1-minimization-based function on the EM energy that is received at the auxiliary subarray and the angle dictionary, non-zero elements in a selection vector, the non-zero elements in the selection vector representing the at least one respective angle associated with each of the one or more objects.

5. The radar system of claim 1, wherein the primary subarray and the auxiliary subarray are uniform linear arrays, wherein the antenna elements of the uniform linear arrays are equally spaced.

6. The radar system of claim 1, wherein the primary subarray is positioned in an azimuth direction, and the auxiliary subarray is positioned in line with the primary subarray in the same azimuth direction.

7. The radar system of claim 1, wherein the primary subarray and the auxiliary subarray are positioned in an azimuth direction, and the auxiliary subarray is positioned with an elevation offset from the primary subarray.

8. The radar system of claim 1, wherein the primary subarray and the auxiliary subarray are positioned in an azimuth direction, and the auxiliary subarray overlaps with at least a portion of the primary subarray.

9. The radar system of claim 1, wherein a quantity of the first antenna elements is greater than a quantity of the second antenna elements.

10. The radar system of claim 1, wherein a ratio of a spacing of the first antenna elements to a spacing of the second antenna elements is approximately equal to an integer.

11. The radar system of claim 10, wherein the integer is an exponential of two.

12. The radar system of claim 1, wherein the radar system is configured to be installed on an automobile.

13. A method comprising:
 determining, based on electromagnetic (EM) energy that is received at a primary subarray of an antenna array, first potential angles of one or more objects that are reflecting the EM energy to the antenna array, the primary subarray comprising multiple first antenna elements;
 determining, based on the EM energy that is received at an auxiliary subarray of the antenna array, second potential angles of the one or more objects, the auxiliary subarray comprising multiple second antenna elements, the second antenna elements having a smaller spacing than the first antenna elements; and
 determining, based on the first potential angles and the second potential angles, at least one respective angle associated with each of the one or more objects by:
  generating, based on the EM energy that is respectively received at the primary subarray and the auxiliary subarray, fast Fourier transform (FFT) spectrum magnitudes for the primary subarray and the auxiliary subarray using a FFT with a pre-defined window;
  normalizing and aligning the FFT spectrum magnitudes for the primary subarray and the auxiliary subarray;
  identifying, based on the normalized and aligned FFT spectrum magnitudes, primary spectrum peaks and auxiliary spectrum peaks;
  filtering out, based on at least one of a magnitude or slope, unqualified spectrum peaks from among the primary spectrum peaks and the auxiliary spectrum peaks; and
  outputting non-filtered spectrum peaks from among the primary spectrum peaks and the auxiliary spectrum peaks as the at least one respective angle associated with each of the one or more objects.

14. The method of claim 13, wherein the primary spectrum peaks and auxiliary spectrum peaks are identified as peaks from the normalized and aligned FFT spectrum magnitudes that are above a threshold value.

15. The method of claim 14, wherein the threshold value is inversely proportional to a signal-to-noise ratio of the EM energy received at the auxiliary subarray.

16. The method of claim 13, wherein determining the at least one respective angle associated with each of the one or more objects further comprises:
 generating unfolded potential angles by unfolding the first potential angles to multiple intervals;
 filtering the unfolded first potential angles from the FFT spectrum magnitudes for the auxiliary subarray to construct an angle dictionary; and
 determining, using an L1-minimization-based function on the EM energy that is received at the auxiliary subarray and the angle dictionary, non-zero elements in a selection vector, the non-zero elements in the selection vector representing the at least one respective angle associated with each of the one or more objects.

17. Non-transitory computer-readable storage media comprising computer-executable instructions that, when executed, cause a processor of a radar system to:
 determine, based on electromagnetic (EM) energy that is received at a primary subarray of an antenna array, first potential angles of one or more objects that are reflecting the EM energy to the antenna array, the primary subarray comprising multiple first antenna elements;
 determine, based on the EM energy that is received at an auxiliary subarray of the antenna array, second potential angles of the one or more objects, the auxiliary subarray comprising multiple second antenna elements, the second antenna elements having a smaller spacing than the first antenna elements; and
 determine, based on the first potential angles and the second potential angles, at least one respective angle associated with each of the one or more objects by:
  generating, based on the EM energy that is respectively received at the primary subarray and the auxiliary subarray, fast Fourier transform (FFT) spectrum magnitudes for the primary subarray and the auxiliary subarray using a FFT with a pre-defined window;
  normalizing and aligning the FFT spectrum magnitudes for the primary subarray and the auxiliary subarray;
  identifying, based on the normalized and aligned FFT spectrum magnitudes, primary spectrum peaks and auxiliary spectrum peaks;
  filtering out, based on at least one of a magnitude or slope, unqualified spectrum peaks from among the primary spectrum peaks and the auxiliary spectrum peaks; and
  outputting non-filtered spectrum peaks from among the primary spectrum peaks and the auxiliary spectrum peaks as the at least one respective angle associated with each of the one or more objects.

18. The non-transitory computer-readable storage media of claim 17, wherein the primary spectrum peaks and auxiliary spectrum peaks are identified as peaks from the normalized and aligned FFT spectrum magnitudes that are above a threshold value.

19. The non-transitory computer-readable storage media of claim 18, wherein the threshold value is inversely proportional to a signal-to-noise ratio of the EM energy received at the auxiliary subarray.

20. The non-transitory computer-readable storage media of claim 17, wherein in determining the at least one respective angle associated with each of the one or more objects, the computer-readable storage media comprises additional computer-executable instructions that, when executed, further cause the processor to:
 generate unfolded potential angles by unfolding the first potential angles to multiple intervals;
 filter the unfolded first potential angles from the FFT spectrum magnitudes for the auxiliary subarray to construct an angle dictionary; and
 determine, using an L1-minimization-based function on the EM energy that is received at the auxiliary subarray and the angle dictionary, non-zero elements in a selection vector, the non-zero elements in the selection vector representing the at least one respective angle associated with each of the one or more objects.

* * * * *